US012746565B2

(12) United States Patent
Zenou et al.

(10) Patent No.: US 12,746,565 B2
(45) Date of Patent: Sep. 29, 2026

(54) METHODS FOR COATING A FOIL USING A COATING SYSTEM WITH AN ADJUSTABLE GAP BETWEEN TWO ROLLERS

(71) Applicant: Reophotonics, Ltd., Modiin (IL)

(72) Inventors: Michael Zenou, Hashmonaim (IL); Elad Dotan, Talmei Yehiel (IL); Mark Sheridan, Hod Hasharon (IL)

(73) Assignee: Reophotonics, Ltd., Modiin (IL)

( * ) Notice: Subject to any disclaimer, the term of this patent is extended or adjusted under 35 U.S.C. 154(b) by 115 days.

(21) Appl. No.: 18/951,225

(22) Filed: Nov. 18, 2024

(65) Prior Publication Data

US 2025/0073739 A1 Mar. 6, 2025

Related U.S. Application Data

(62) Division of application No. 17/821,551, filed on Aug. 23, 2022, now Pat. No. 12,194,488.

(51) Int. Cl.
*B05D 1/26* (2006.01)
*B05C 1/08* (2006.01)

(52) U.S. Cl.
CPC .......... *B05C 1/0882* (2013.01); *B05C 1/0808* (2013.01); *B05C 1/0817* (2013.01); *B05C 1/083* (2013.01); *B05D 1/26* (2013.01); *B05D 2252/02* (2013.01)

(58) Field of Classification Search
CPC ................................ B05C 1/0882; B05D 1/26
See application file for complete search history.

(56) References Cited

U.S. PATENT DOCUMENTS

| | | | |
|---|---|---|---|
| 4,869,200 | A | 9/1989 | Euverard |
| 5,409,732 | A | 4/1995 | Leonard et al. |
| 5,413,806 | A | 5/1995 | Braun |
| 5,961,899 | A | 10/1999 | Rossetti et al. |
| 6,174,394 | B1 | 1/2001 | Gvon et al. |
| 8,028,647 | B2 | 10/2011 | McMurtry et al. |
| 9,080,287 | B2 | 7/2015 | Gustafson et al. |

(Continued)

OTHER PUBLICATIONS

International Search Report and Written Opinion mailed Oct. 12, 2023, from the ISA/European Patent Office, for International Patent Application No. PCT/IB2023/056528 (filed Jun. 23, 2023), 12 pgs.

(Continued)

*Primary Examiner* — Karl Kurple
(74) *Attorney, Agent, or Firm* — Ascenda Law Group, PC

(57) ABSTRACT

In a coating system, two rollers are arranged adjacent to one another. A donor foil with rheological material dispensed thereon is advanced through a gap between the two rollers. Such gap spreads the dispensed material over the donor foil, coating the donor foil with a layer of the material with a uniform thickness associated with the gap width. Each roller is supported on a holder. Adjustment of the gap width may be effected by keeping the position of one of the holders fixed, while horizontally translating the position of the other holder. The position of the translatable holder may be adjusted by pistons and linear actuators. The pistons may bias the moveable holder towards the stationary holder. The linear actuators mounted on the moveable holder may extend respective arms against the stationary holder, thereby countering the biasing of the pistons and pushing the moveable holder away from the stationary holder.

10 Claims, 12 Drawing Sheets

(56) References Cited

U.S. PATENT DOCUMENTS

| | | | |
|---|---|---|---|
| 9,841,265 | B2 | 12/2017 | VanValkenburgh et al. |
| 10,099,422 | B2 | 10/2018 | Zenou et al. |
| 10,144,034 | B2 | 12/2018 | Zenou |
| 10,603,684 | B2 | 3/2020 | Zenou et al. |
| 11,850,622 | B2 | 12/2023 | Gao et al. |
| 2012/0310596 | A1 | 12/2012 | Gustafson et al. |
| 2014/0314946 | A1 | 10/2014 | Ahmaniemi et al. |
| 2015/0300800 | A1 | 10/2015 | VanValkenburgh et al. |
| 2016/0375679 | A1 | 12/2016 | Schmale et al. |
| 2019/0128756 | A1 | 5/2019 | Noe et al. |
| 2019/0283076 | A1 | 9/2019 | Zenou et al. |
| 2021/0267067 | A1 | 8/2021 | Gilan et al. |
| 2021/0331196 | A1 | 10/2021 | Zenou et al. |

OTHER PUBLICATIONS

Restriction Requirement dated Mar. 8, 2024, for U.S. Appl. No. 17/821,551, filed Aug. 23, 2022, 5 pgs.

Amendment filed Mar. 11, 2024, for U.S. Appl. No. 17/821,551, filed Aug. 23, 2022, 6 pgs.

Non-Final Office Action dated Jul. 3, 2024, for U.S. Appl. No. 17/821,551, filed Aug. 23, 2022, 20 pgs.

Amendment filed Sep. 6, 2024, for U.S. Appl. No. 17/821,551, filed Aug. 23, 2022, 10 pgs.

Notice of Allowance mailed Nov. 14, 2024, for U.S. Appl. No. 17/821,551, filed Aug. 23, 2022, 10 pgs.

METHODS FOR COATING A FOIL USING A COATING SYSTEM WITH AN ADJUSTABLE GAP BETWEEN TWO ROLLERS

RELATED APPLICATIONS

This application is Divisional Application of U.S. application Ser. No. 17/821,551 (now issued as U.S. Pat. No. 12,194,488), filed on 23 Aug. 2022, incorporated by reference herein.

FIELD OF THE INVENTION

The present invention relates to methods and systems for coating a foil with rheological material, and more particularly relates to controlling the width of a gap between two rollers in a coating system.

BACKGROUND

There are various known methods for the formation of high-quality coatings on foils and, accordingly, various devices which implement these methods. For example, wet solutions can be applied using a drawing plate or a wiper (squeegee), which can be of a blade (sheet) or cylinder type. However, those devices do not ensure the formation of highly anisotropic coatings with reproducible characteristics, and this technology of coating formation requires prolonged preliminary work for determining the optimum application conditions for every batch of the initial raw materials. Attempts at solving these problems led to the creation of rather complicated devices, and applicators known in the prior art also include devices of the slot-die coating system type. Various devices of the prior art are described in U.S. Pat. Nos. 4,869,200, 6,174,394, and 8,028, 647.

Despite such solutions, problems still exist regarding the need for combining the necessary properties in one device, including simple control over the coating parameters (in particular, thickness), and the possibility for improving the quality of applied coatings by compensating for substrate unevenness.

SUMMARY OF THE INVENTION

An object of the present invention is to produce coatings at a high rate of application, low consumption of the raw material, and high-precision control over the foil thickness at very low cost. In addition, it is desired that the applicator device be adjustable to obtain the films of the desired thickness from various rheological materials having varied physical properties.

In accordance with one embodiment of the present invention, two rollers are arranged adjacent to one another. A donor foil with rheological material dispensed thereon may be advanced through a gap between the two rollers. Such gap spreads the dispensed material over the donor foil, coating the donor foil with a layer of the material with a uniform thickness associated with the gap width. Each roller may be supported on a holder. Adjustment of the gap width may be effected by keeping the position of one of the holders fixed, while horizontally translating the position of the other holder. The position of the translatable holder may be adjusted by pistons and linear actuators. The pistons may bias the moveable holder towards the stationary holder. The linear actuators mounted on the moveable holder may extend respective arms against the stationary holder, thereby countering the biasing of the pistons and pushing the moveable holder away from the stationary holder.

A surface of the roller mounted on the moveable holder may be protected by a cleaning foil. In the coating operation, the donor foil may be advanced through the gap with the cleaning foil stationary. During a cleaning operation, any residual material left on the cleaning foil may be removed by advancing the cleaning foil through the gap so as to position a fresh portion of cleaning foil adjacent to the gap.

Such coating system is especially important in applications where the coating quality is of great importance for the overall performance of the system. An important example of this kind of application is the family of laser-enhanced jetting applications (see, e.g., U.S. Pat. Nos. 10,144,034 and 10,099,422). In this application, a highly uniform layer of material is needed in order to enable a stable and reproducible jetting of material.

In accordance with one embodiment of the invention, a width of the gap is inferred by a laser-based displacement sensor and a piezoelectric sensor to detect an initial starting position of the respective arms of the linear actuators.

In accordance with one embodiment of the invention, a coating system coats a thin foil with a desired material at a desired thickness. The material can be a viscous material in the form of a liquid or a paste, or a low viscosity material. The material could also be an adhesive, a metal or ceramic paste, or any polymeric solution.

The rollers that can be used to create the gap can be made from metal, ceramic or rubber, such as a polyurethane rubber or other rubber, that will create a softer contact. By design, the coating quality is determined by the surface roughness of the rollers and therefore a smoother surface will lead to a better coating quality. In a preferred embodiment, the surface roughness is less than 1 micron.

The width of the gap between the two rollers determines the thickness of the material layer directly or via a correlation table (e.g., material layer thickness may be equal to the gap between the two rollers minus the thickness of the two foils).

Additional rollers can be added to form a tapered constriction between the two foils.

The donor foil may be advanced through the gap over one roller and a cleaning foil may be advanced through the gap over a second roller. In one embodiment, the cleaning foil can be advanced along with the donor foil during the coating operation to remove any residue from a previous coating operation, to recover unused material, or for other purposes. In another embodiment, during the coating operation, the donor foil can be advanced through the gap with the cleaning foil remaining stationary, while during a cleaning operation, the donor foil can remain stationary while the cleaning foil is advanced through the gap by a roller and then wound about the roller. Using the cleaning foil enables the coating of multiple types of materials one after the other without any contamination, creating a very powerful tool for printing different materials in consecutive order.

As the donor foil is advanced through the gap between its roller and the cleaning foil, the material may form a layer with thickness equal to the shortest distance between the two foils.

Each roller can be rotated about its respective axis by a motor to change the portion of the roller surface that forms the gap. Changing the roller position lengthens the cleaning cycle of the rollers. When the roller surface becomes contaminated, the roller can be rotated several degrees by the motor to position a fresh portion of the roller surface adjacent to the gap for the subsequent coating operation.

Another way to prolong the life of the rollers is to add a cleaning system to the side of each of the rollers facing away from the gap. Such cleaning systems may be used to scrub contaminants from the respective roller during the operation of the roller.

One of the rollers can be rotated about its axis, but cannot be translated in the horizontal direction, while the other roller can both be rotated about its axis as well as be translated in the horizontal direction. The roller that can be translated in the horizontal direction may be mounted on a housing that is continuously biased towards the opposite roller by one or more pistons.

The coating system can also be equipped with one or more ultrasound transducers that contact one or both of the rollers so as to assist with the coating of highly viscous materials on the donor foil.

The coating system may be equipped with two optical, mechanical, or electrical limit switches for identifying when the respective arms of the linear actuator have reached a mechanical limit.

BRIEF DESCRIPTION OF THE DRAWINGS

The present invention illustrated by way of example, and not limitation, in the figures of the accompanying drawings, in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components.

Figure 1:
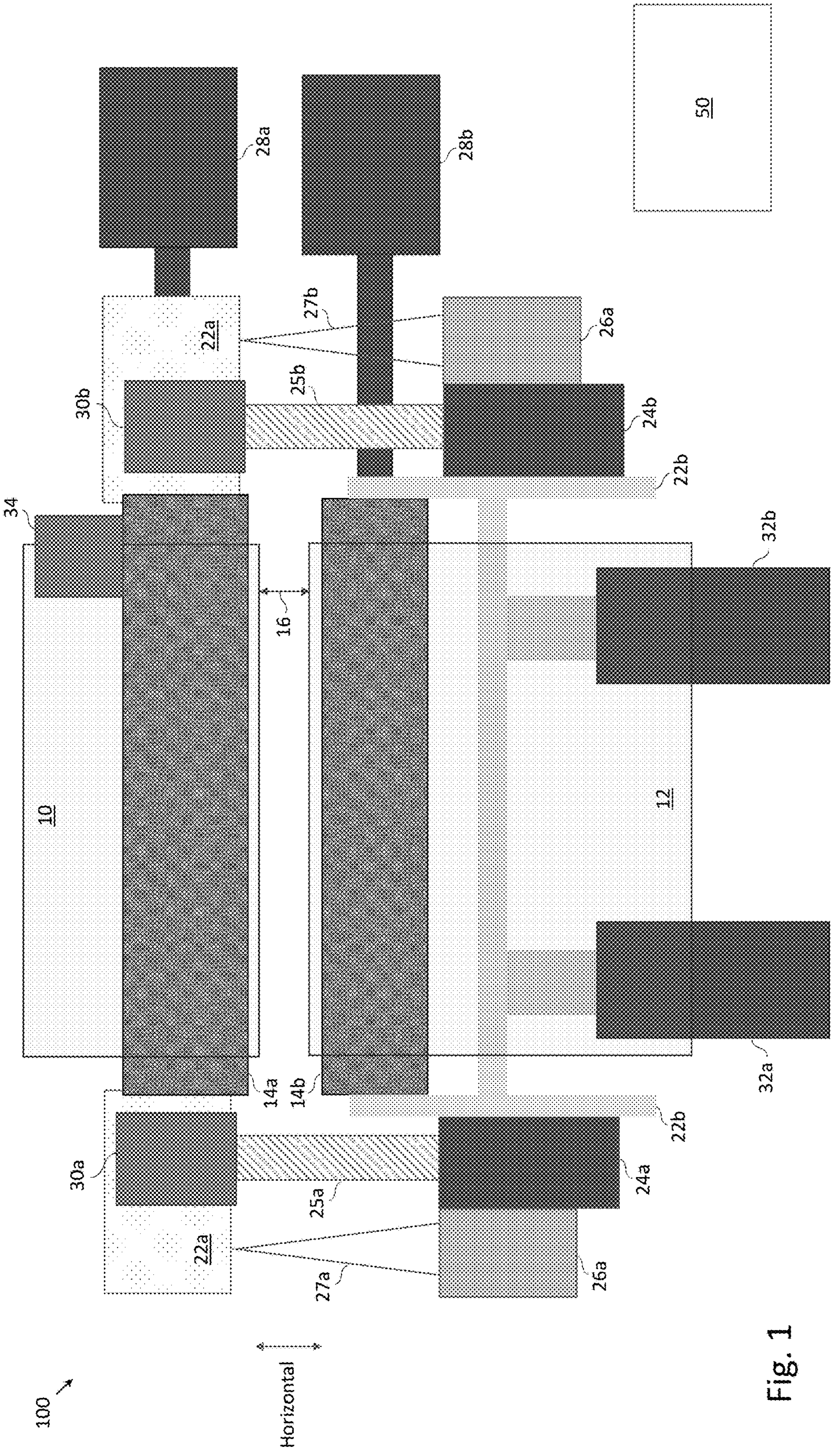
FIG. 1 depicts a top view of a coating system, in accordance with one embodiment of the invention.

Before describing the invention in detail, it is helpful to present an overview. FIG. 1 depicts a top view of the coating system 100 that contains several components for accurately controlling the width of the gap 16 between a pair of rollers 14*a*, 14*b*. Such width is associated with a thickness of a coating that is formed on a donor foil 10 as that foil 10 is advanced through the gap 16.

Roller 14*a* may be held stationary in the horizontal direction by a holder 22*a*, and may be rotated about its axis by motor 28*a*. The other roller 14*b* may be supported by another holder 22*b*, and similarly may be rotated about its axis by motor 28*b*.

In contrast to roller 14*a*, roller 14*b* can be translated in the horizontal direction, and the translation in the horizontal direction may be controlled as follows. A force may be constantly exerted by pistons 32*a*, 32*b* on holder 22*b* in the direction towards holder 22*a*, which biases roller 14*b* towards roller 14*a*. A pair of linear actuators 24*a*, 24*b* may be mounted on the holder 22*b* for adjusting a respective position of the arms 25*a*, 25*b*. While the arms 25*a*, 25*b* are in contact with holder 22*a* (or a component rigidly mounted to holder 22*a*), retraction of the arms 25*a*, 25*b* allows the biasing of pistons 32*a*, 32*b* to take effect, narrowing the width of gap 16. While the arms 25*a*, 25*b* are in contact with holder 22*a* (or some component rigidly mounted to holder 22*a*), extension of the arms 25*a*, 25*b* counteracts the biasing by the pistons 32*a*, 32*b*, increasing the width of gap 16. As shown in FIG. 1, each of the arms 25*a*, 25*b* may be disposed beyond one end of the roller 14*b*, or stated another way, the roller 14*b* may be disposed between the two arms 25*a*, 25*b*.

Piezoelectric sensors 30*a*, 30*b* may be mounted on the holder 22*a* for detecting an initial contact of the respective arms 25*a*, 25*b* on the piezoelectric sensors 30*a*, 30*b*. Knowledge of such initial contact is important as the length of the arms that coincides with such initial contact will correspond with a zero distance in the width of gap 16. Thereafter, an increase in the length of the arms 25*a*, 25*b* by a certain distance will translate into an increase in the width of gap 16 by the same distance. As the change in the length of the arms 25*a*, 25*b* may be an output of the linear actuators 24*a*, 24*b*, the distance of the gap 16 may be inferred based on the knowledge of such initial contact and the subsequent change in the length of the arms 25*a*, 25*b*.

The distance of the gap 16 may further be inferred based on the measurements of one or more distance sensors 26*a*, 26*b* mounted on holder 22*b*. In one embodiment, each distance sensor 26*a*, 26*b* may transmit a laser beam 27*a*, 27*b*, and the distance between the distance sensor 26*a*, 26*b* and the holder 22*a* may be computed based on the round trip time of the laser beam 27*a*, 27*b* and the speed of light. The use of distance sensors 26*a*, 26*b* will be more fully explained in connection with FIGS. 5A-5B and 6A-6C.

An ultrasonic transducer 34 may be used to drive the dispensed material from the center of the donor foil 10 towards the sides of the donor foil 10. The ultrasonic transducer 34 will be described in more detail below in FIG. 7.

A controller 50 is further depicted in FIG. 1. While not depicted in detail, it is understood that such controller 50 may be communicatively coupled to the components depicted in FIG. 1 (e.g., linear actuators 24*a*, 24*b*, distance sensors 26*a*, 26*b*, motors 28*a*, 28*b*, piezoelectric sensors 30*a*, 30*b*, and ultrasonic transducer 34). For example, the controller 50 may be configured to control the linear actuators 24*a*, 24*b* so as to adjust a position of roller 14*b* relative to a position of roller 14*a*, thereby adjusting the width of the gap 16 between these rollers 14*a*, 14*b*. Further, controller 50 may be configured to receive distance measurements from the distance sensors 26*a*, 26*b*. Further, controller 50 may be configured to receive the respective length of the arms 25*a*, 25*b* or the relative change in the respective length of the arms 25*a*, 25*b* from the linear actuators 24*a*, 24*b*. Further, controller 50 may be configured to receive measurements from the piezoelectric sensors 30*a*, 30*b* that indicate whether a contact has been formed between the arms 25*a*, 25*b* and the piezoelectric sensors 30*a*, 30*b*. Further, controller 50 may control the operation of motors 28*a*, 28*b* in order to rotate the rollers 14*a*, 14*b* during a cleaning operation. Further, controller 50 may turn the ultrasonic transducer 34 on or off.

Figure 2A:
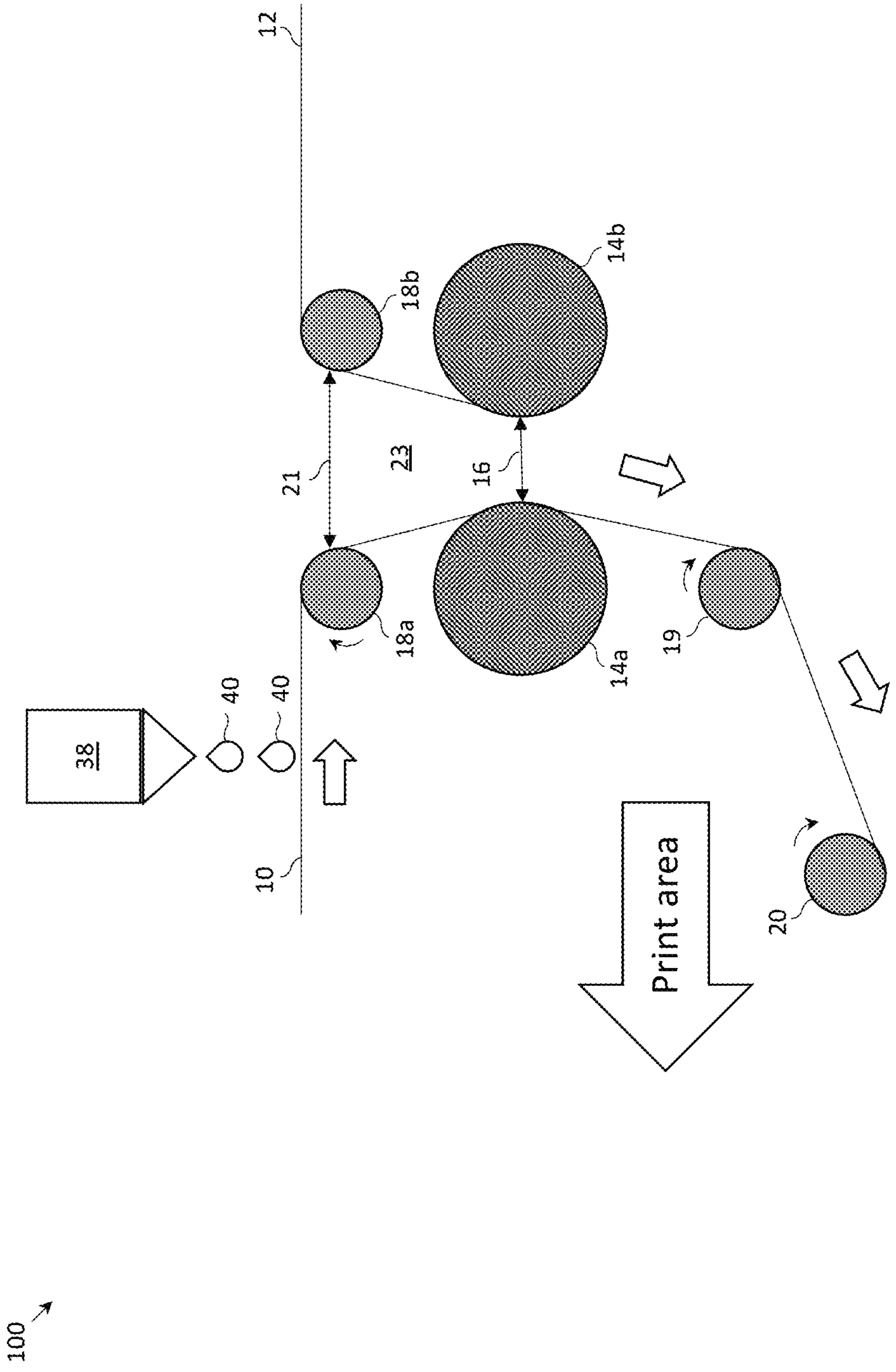
FIG. 2A depicts a simplified side view of the coating system showing a dispensing unit dispensing material onto a donor foil that is advanced through a gap between two rollers, in accordance with one embodiment of the invention.

FIG. 2A depicts a simplified side view of the coating system 100 showing a dispensing unit 38 dispensing material 40 onto a donor foil 10 that is advanced through the gap 16 between the above-described rollers 14*a*, 14*b*. A cleaning foil 12 may be present to protect the surface of roller 14*b*. In the event that material 40 adheres to the cleaning foil 12 in the proximity of gap 16 (e.g., residual material that is left over from a coating operation), roller 14*b* may be rotated to advance a clean section of the cleaning foil 12 next to the gap 16. Such ability of the cleaning foil 12 may be particularly useful if the coating system 100 is used to form coatings of different types of materials 40, so that the coating of one material does not contaminate the coating of another material in a subsequent coating step.

Rollers 18*a*, 18*b* may be disposed above the rollers 14*a*, 14*b* for creating a tapered constriction 23. That is, the width of the gap 21 between rollers 18*a*, 18*b* may be greater than the width of the gap 16 between rollers 14*a*, 14*b*, thereby creating a tapered constriction 23 between the two foils 10, 12, which allows a better coating to be formed on the donor foil 10.

In one embodiment, the rollers 14*a*, 14*b* are stationary during the coating phase, and are only rotated during a cleaning phase. Therefore, during the coating operation, rollers 18*a*, 19 and 20 may be rotated about their respective axes in order to advance the donor foil 10 through the gap 16 and towards a print area (not depicted). As is known in the art, in the print area, a laser may be used to jet material from the donor foil 10 towards a receiver substrate in a laser-enhanced jetting printing process. The number of the rollers may depend on other design parameters of the coating system 100. Some designs will need more rollers than others while some designs will not need rollers 18*a*, 18*b*, 19, and 20 at all.

Figure 2B:
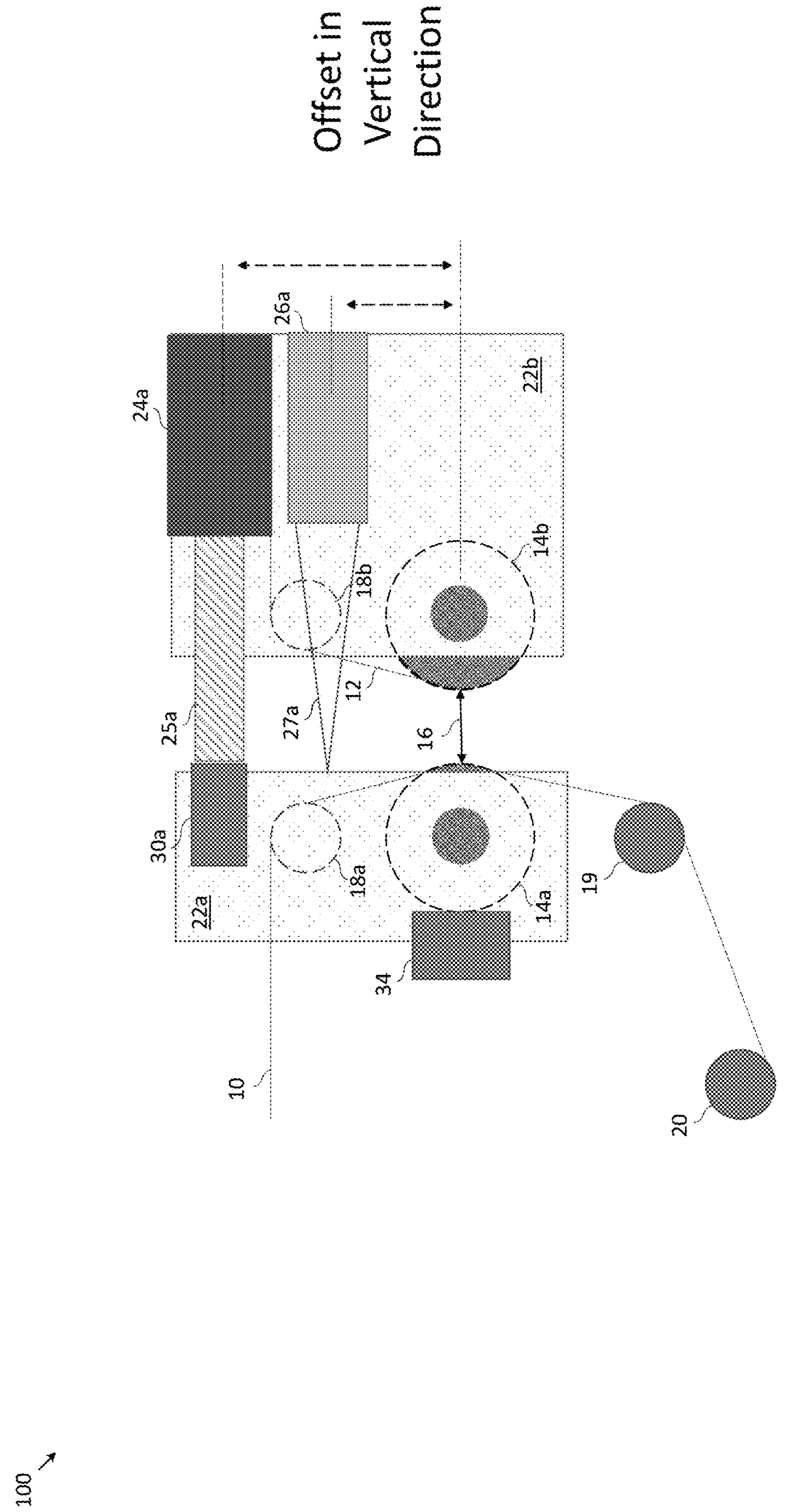
FIG. 2B depicts a more complete side view of the coating system, in accordance with one embodiment of the invention.

FIG. 2B depicts a more complete side view of the coating system 100. As shown, a vertical offset may be present between the rollers 14*a*, 14*b* and the distance sensors 26*a* (26*b* not visible in FIG. 2B). A vertical offset may be present between the rollers 14*a*, 14*b* and the linear actuators 24*a* (24*b* not visible in FIG. 2B). Similarly, a vertical offset may be present between the rollers 14*a*, 14*b* and the piezoelectric sensors 30*a* (30*b* not visible in FIG. 2B). As shown in FIG. 2B, gap 16 may be the smallest distance separating roller 14*a* from roller 14*b*.

Figure 3:
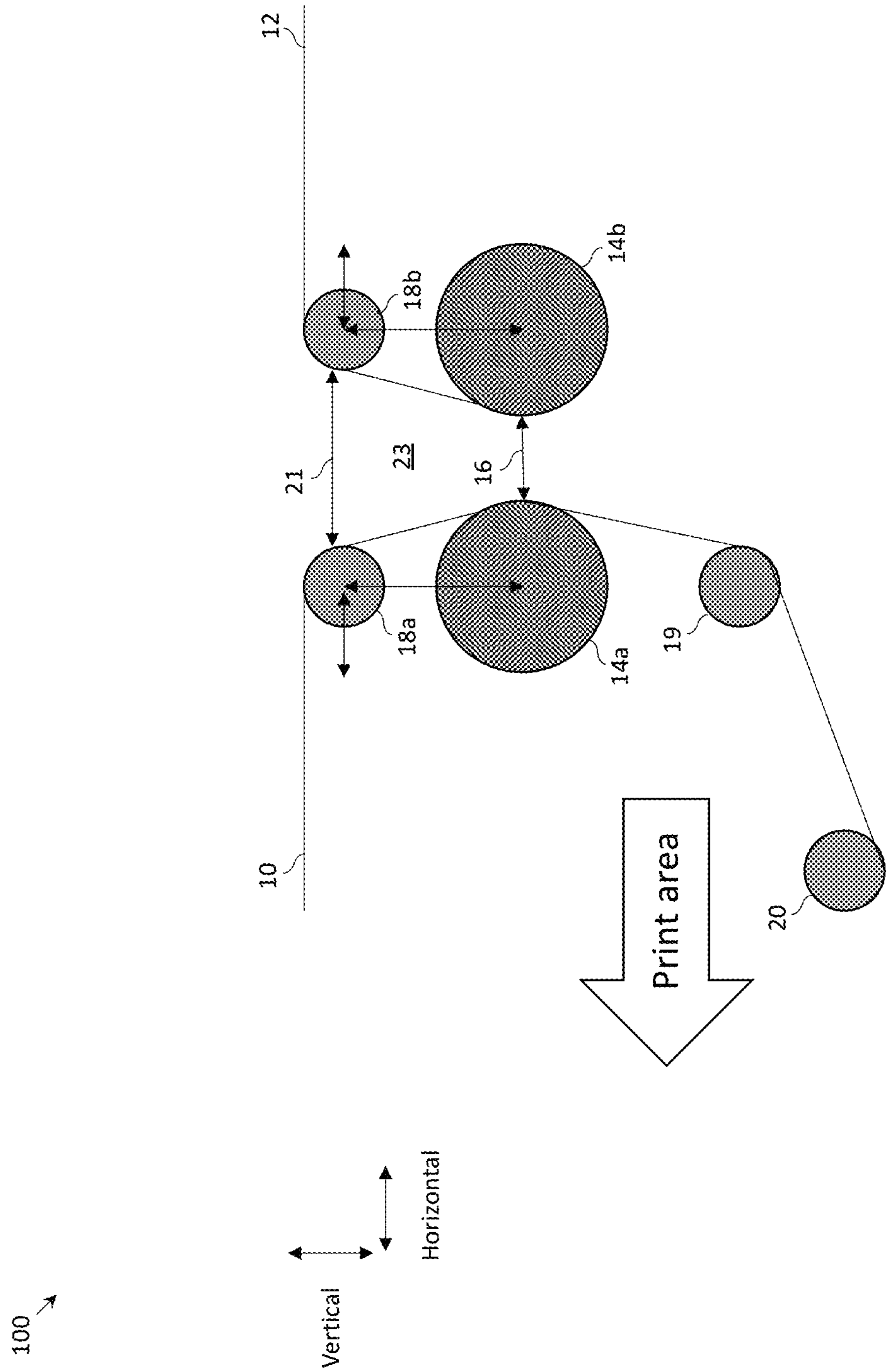
FIG. 3 depicts a simplified side view of the coating system showing possible horizontal and vertical adjustment in the positions of the upper pair of rollers, in accordance with one embodiment of the invention.

FIG. 3 depicts a simplified side view of the coating system 100 showing possible horizontal and vertical adjustment in the respective positions of the rollers 18*a*, 18*b*. By changing the position of the rollers 18*a*, 18*b*, the shape of the tapered constriction 23 formed by the foils 10, 12 may be adjusted. Adjusting the rollers 18*a*, 18*b* in the horizontal direction may create a wider or narrower mouth of the tapered constriction 23, while adjusting the rollers 18*a*, 18*b* in the vertical direction may adjust the volume of the material 40 in the tapered constriction 23. Both of those adjustments (i.e., horizontal and vertical) are important to the coating process and the desired adjustments will depend on the particular material 40 that is used, in which more viscous materials tend to work better in narrower constrictions 23.

Figure 4:
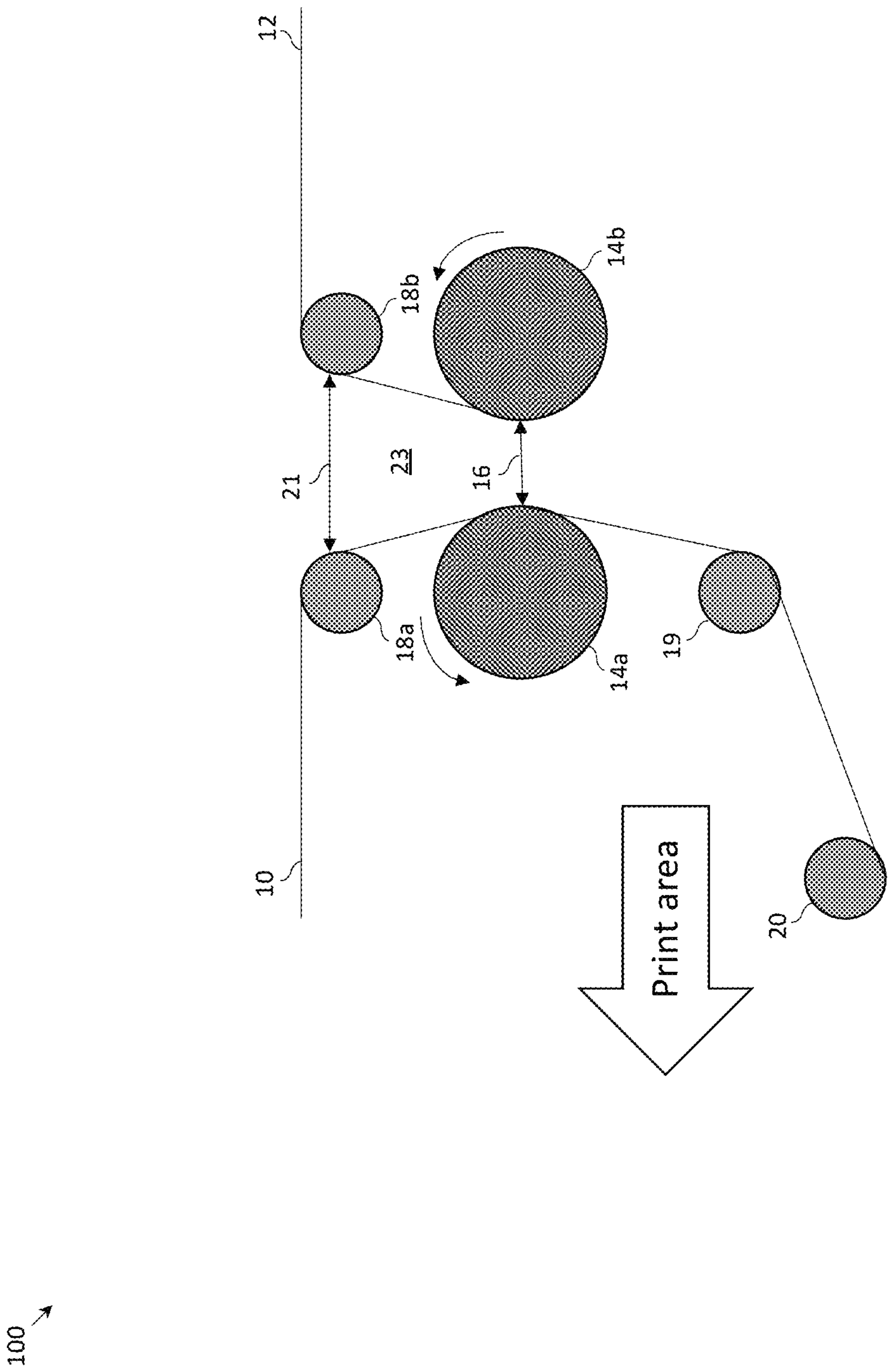
FIG. 4 depicts a simplified side view of the coating system showing possible rotational movement of the lower pair of rollers, in accordance with one embodiment of the invention.

FIG. 4 depicts the rotation of the rollers 14*a*, 14*b* about their respective axes during a cleaning operation. As previously described, each roller 14*a*, 14*b* may be stationary during the coating process to provide the best coating quality. However over time, some material 40 may flow out of the tapered constriction 23 and contaminate the rollers 14*a*, 14*b*. If the contamination is widespread, the operator will need to clean it, but if only a small amount of material 40 has contaminated the rollers 14*a*, 14*b*, the rollers 14*a*, 14*b* can be rotated so that uncontaminated regions of the rollers 14*a*, 14*b* are used to form the gap 16. The rollers 14*a*, 14*b* still may require periodic cleaning by a human operator to remove the contaminants from the rollers 14*a*, 14*b*, but the time between such periodic human cleaning may be increased.

Figure 8:
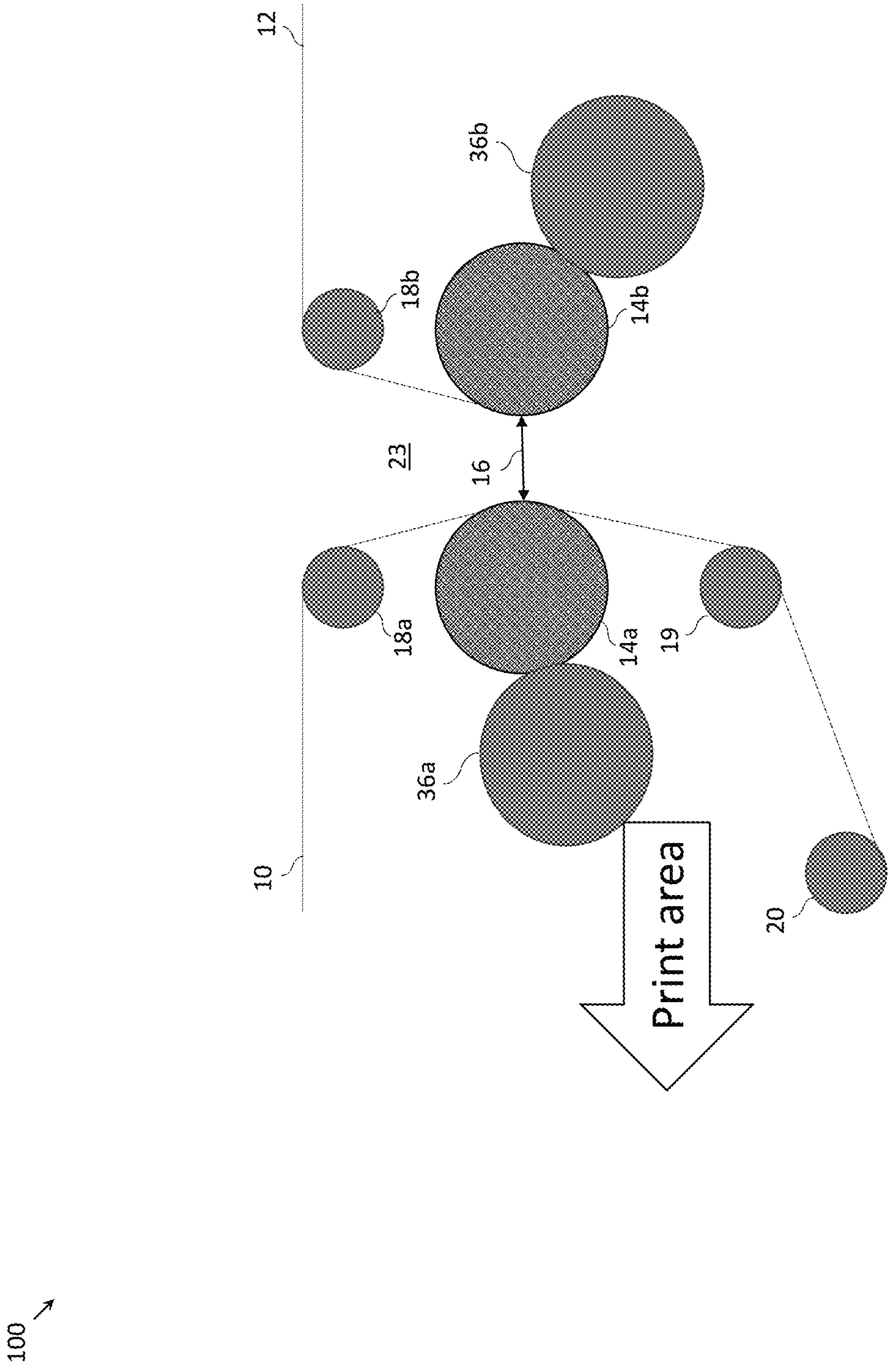
FIG. 8 depicts an optional cleaning system for reducing the frequency of maintenance of the coating system, in accordance with one embodiment of the invention.

Another approach to address this issue is presented in FIG. 8, in which a cleaning system 36*a*, 36*b* is disposed adjacent to each of the rollers 14*a*, 14*b* (i.e., on their respective sides facing away from the gap 16). In one embodiment, each of the cleaning systems 36*a*, 36*b* can be a scraper or knife that removes residual material from the rollers 14*a*, 14*b*. In another embodiment, each of the cleaning systems 36*a*, 36*b* can include a sponge and a reservoir of solvent to clean the rollers 14*a*, 14*b* from time to time. Such cleaning systems 36*a*, 36*b* may be particularly needed with low viscosity materials that will tend to more frequently flow out of the tapered constriction 23 or to remove reactive materials such as epoxies that can progressively and/or permanently damage the rollers 14*a*, 14*b* if not removed in a timely manner.

Figure 5A:
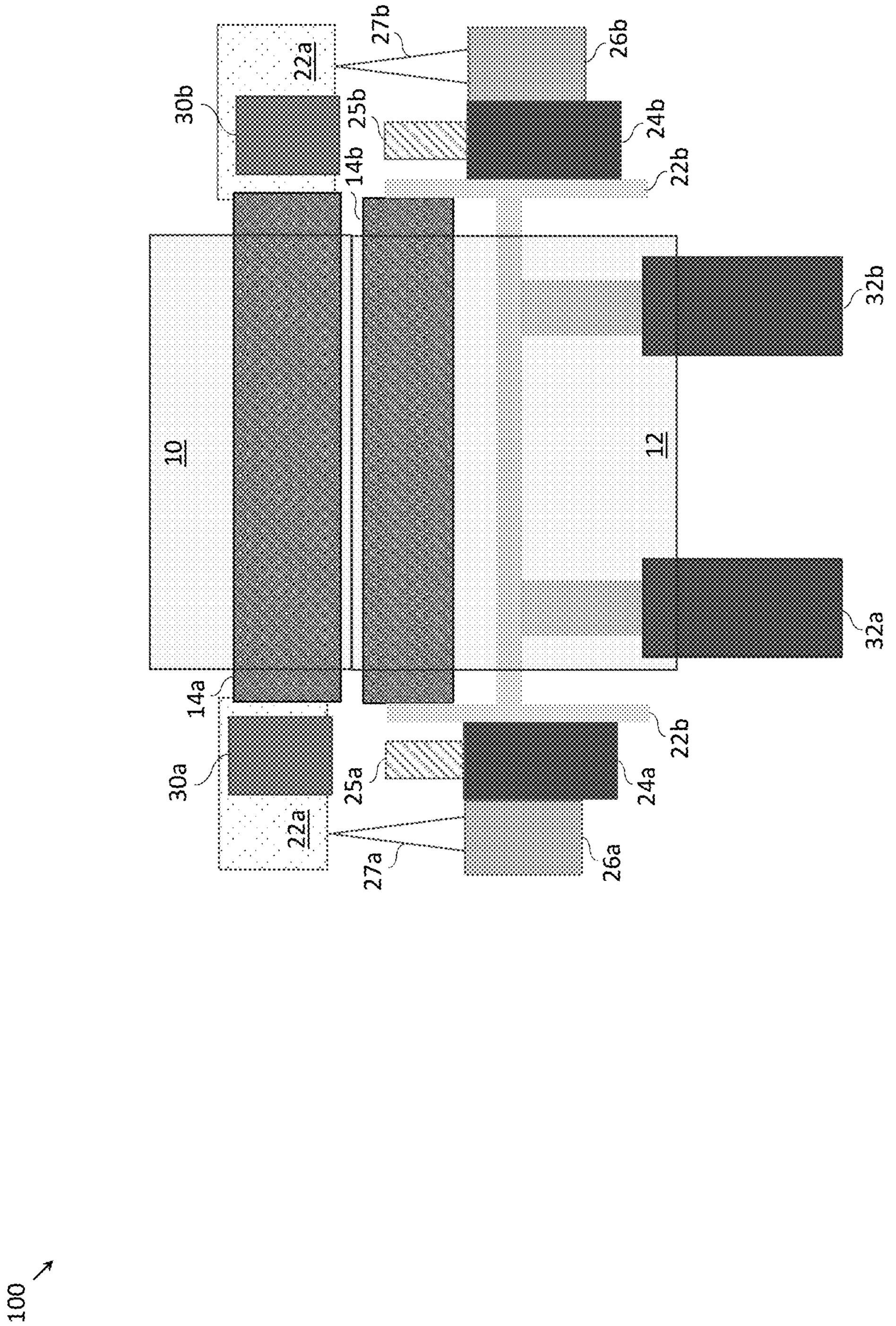
FIGS. 5A-5B depict the calibration of the coating system, in accordance with one embodiment of the invention.
Figure 5B:
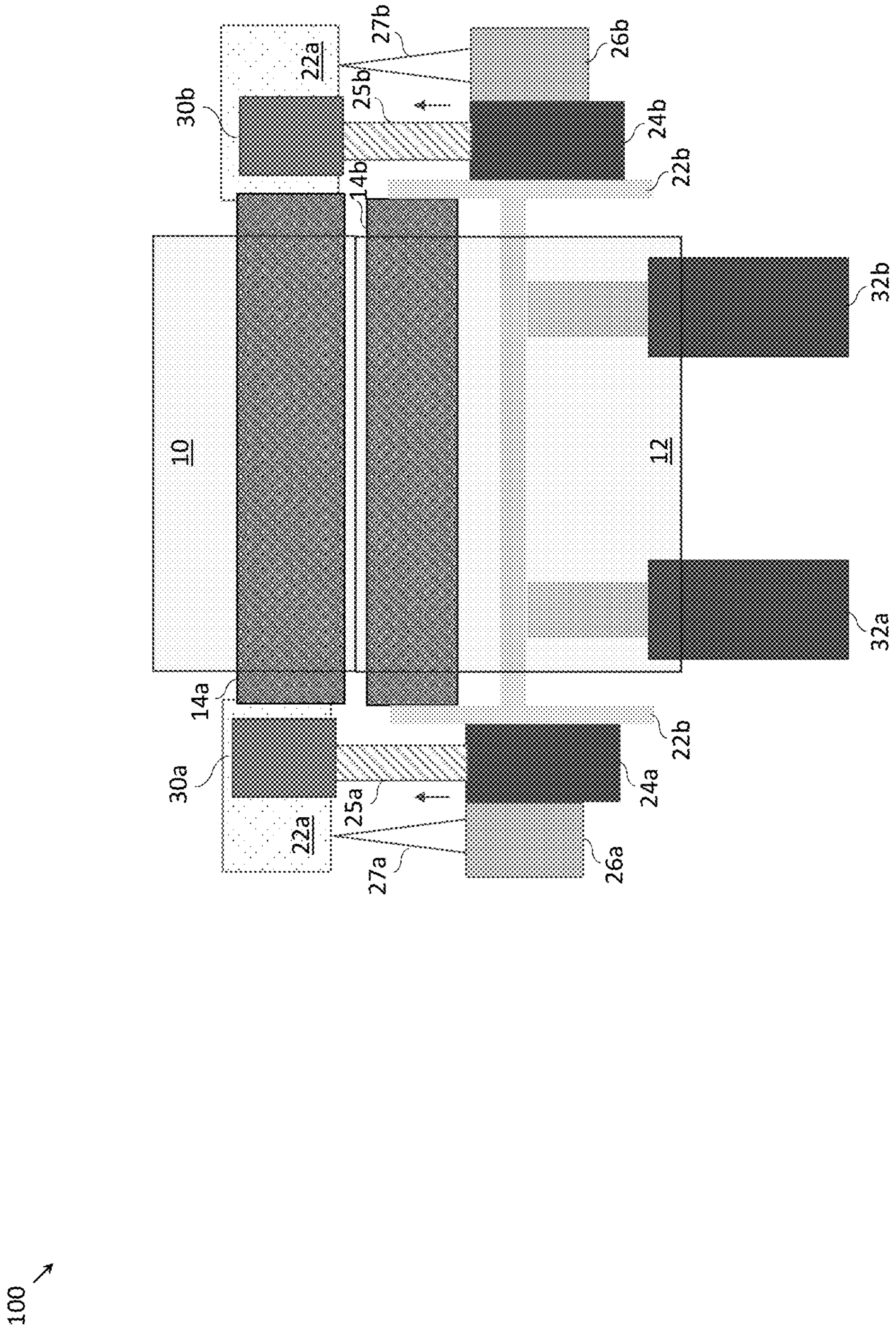

FIGS. 5A-5B depict the calibration process of the system. As shown in FIG. 5A, to find the starting position of the holder 22*b*, the respective arms 25*a*, 25*b* of the linear actuators 24*a*, 24*b* are retracted, and the pistons 32*a*, 32*b* are used to push the moveable holder 22*b* towards the stationary holder 22*a*. Once the rollers 14*a*, 14*b* are in contact with one another, the starting position of the holder 22*b* is reached, and the displacement sensors 26*a*, 26*b* may be used to measure respective starting distances $d_a$, $d_b$ between the displacement sensors 26*a*, 26*b* and the holder 22*a*.

Figure 6A:
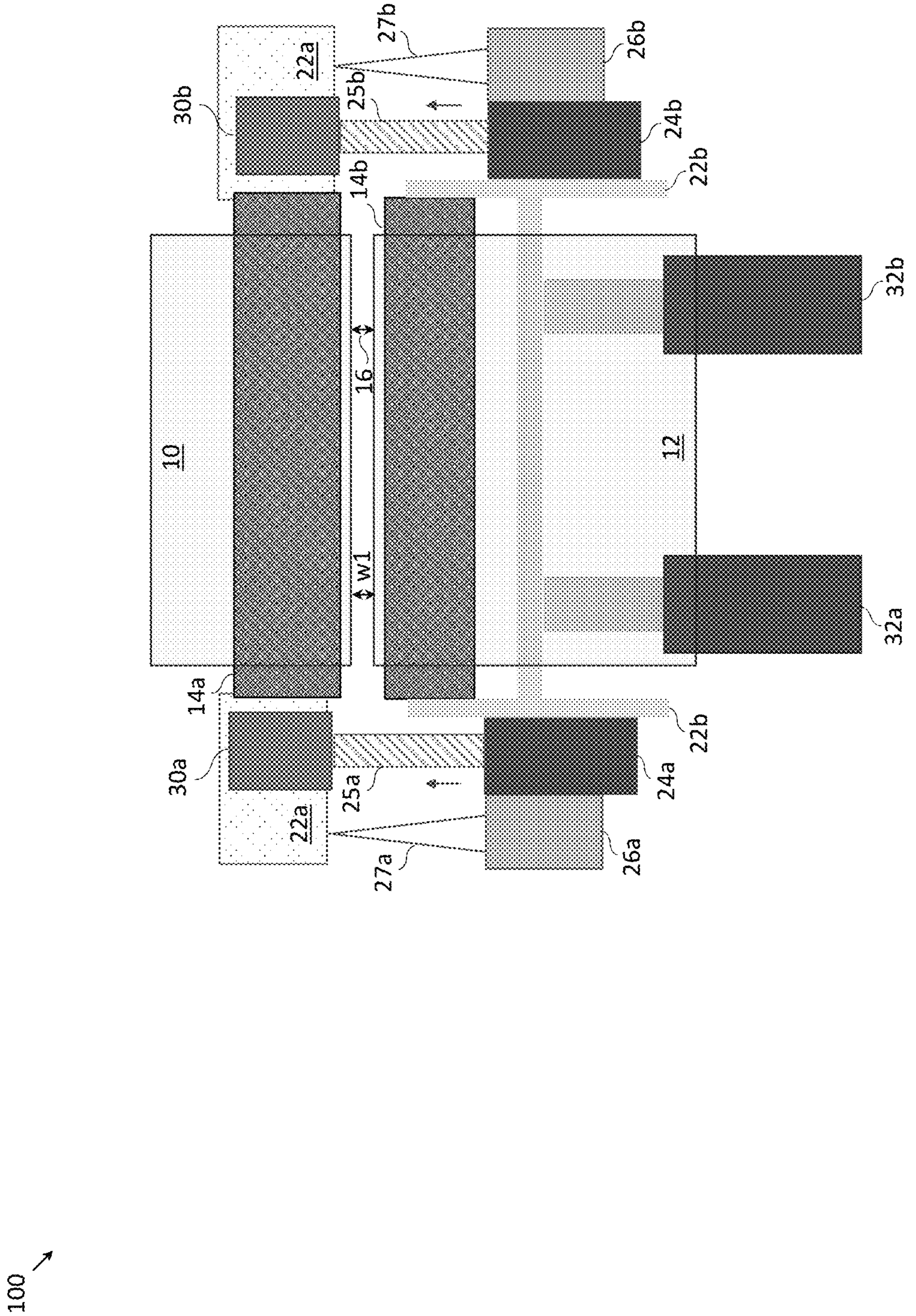
FIGS. 6A-6C depict the operation of the coating system to transition between a coating step (with narrow gap width) and a foil retraction step prior to recoating (with wider gap width), in accordance with one embodiment of the invention.

Next, as shown in FIG. 5B, the arms 25*a*, 25*b* of the actuator 24*a*, 24*b* are extended until they contact the piezoelectric sensors 30*a*, 30*b*. Once the piezoelectric sensors 30*a*, 30*b* detect the contact of the arms 25*a*, 25*b*, such lengths of the arms 25*a*, 25*b* may be recorded as the starting lengths $l_a$, $l_b$ of the arms. In another embodiment, the moment the distance sensors 26*a*, 26*b* measure the respective distances deviating from the respective starting distances $d_a$, $d_b$, such lengths of the arms 25*a*, 25*b* may be recorded as the starting lengths $l_a$, $l_b$ of the arms. In another embodiment, once the piezoelectric sensors 30*a*, 30*b* detect the contact of the arms 25*a*, 25*b* (or the distance sensors 26*a*, 26*b* measure the respective distances deviating from the respective starting distances $d_a$, $d_b$), the lengths of the arms 25*a*, 25*b* may be set to a relative zero value (similar to the process of taring a scale), in which case $l_a$ and $l_b$ are set to zero. To adjust the width of the gap 16 to a desired width value, $w_1$, the coating system 100 may rely upon one or more of the starting distances $d_a$, $d_b$ measured by the distance sensors 26*a*, 26*b* and the starting lengths $l_a$, $l_b$ of the arms 25*a*, 25*b*. In the former case, linear actuator 24*a* may adjust arm 25*a* until the distance measured by distance sensor 26*a* equals $d_a+w_1$, and linear actuator 24*b* may adjust arm 25*b* until the distance measured by distance sensor 26*b* equals $d_b+w_1$. In the latter case, linear actuator 24*a* may adjust arm 25*a* until the length of the arm 25*a* equals $l_a+w_1$, and linear actuator 24*b* may adjust arm 25*b* until the length of the arm 25*b* equals $l_b+w_1$. FIG. 6A depicts the gap 16 of the coating system 100 after it has been adjusted to the desired width, $w_1$, and such width may be maintained during the coating of donor foil 10 with material 40.

During laser-enhanced printing in the print area, some portions of the material 40 on the donor foil 10 may be jetted from the donor foil 10 onto a receiver substrate, while other portions of the material 40 may remain on the donor foil 10. One approach would be to continue advancing the donor foil 10 past the print area and dispose the material 40 that is left on the donor foil 10. However, this is a wasteful approach and should only be used if speed is the most important parameter of the coating system 100 and the material cost is very low. A better approach to reduce the amount of wasted material would be to attempt to reuse the material 40 that remains on the donor foil 10 after the printing. To that end, the donor foil 10 with the unused material 40 thereon may be returned back into the constriction 23 and together with a small amount of additionally dispensed material 40 from dispensing unit 38, the coating system 100 may form a new coating of material 40 on the donor foil 10 during a recoat process.

Figure 6B:
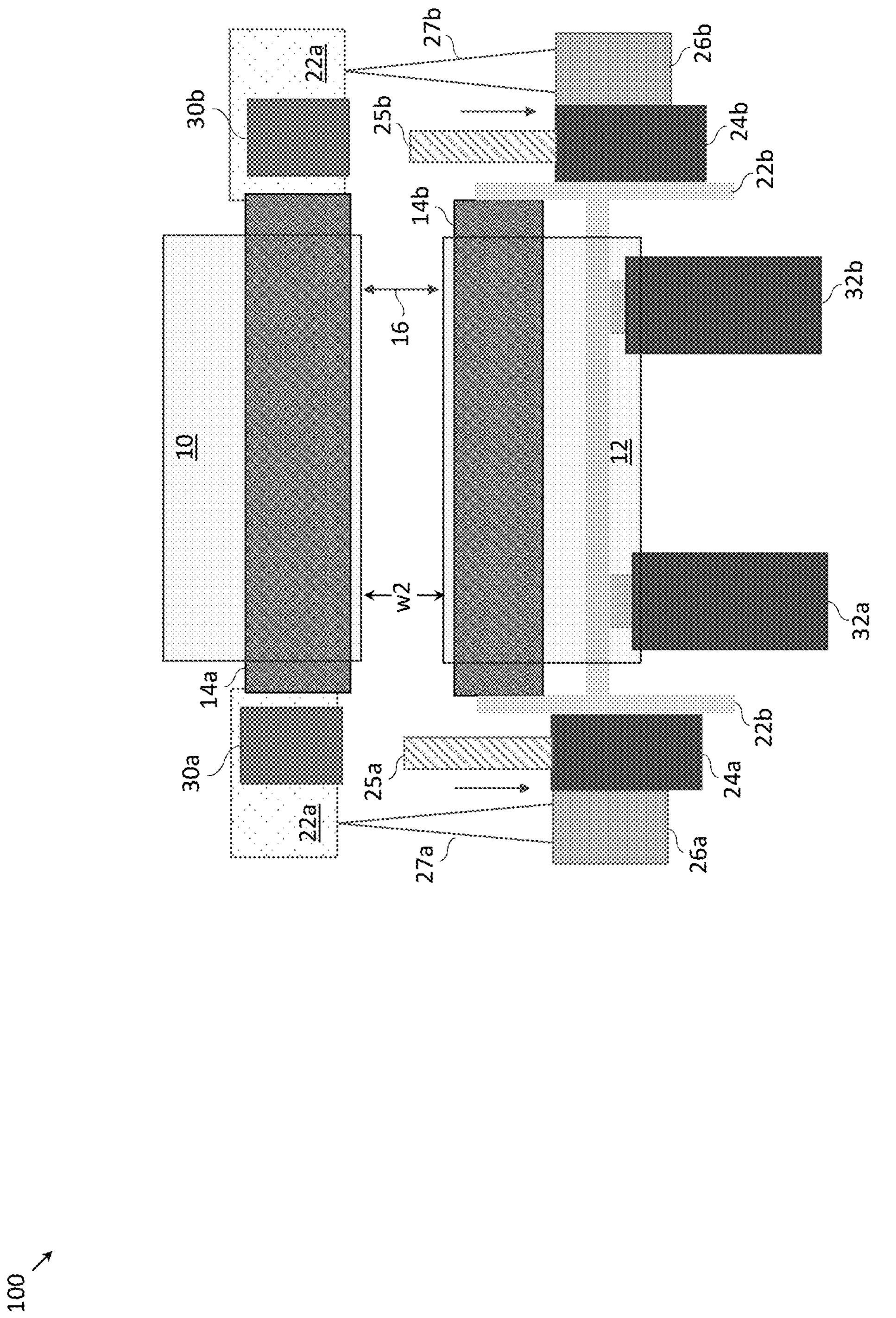

FIG. 6B depicts the configuration of the coating system 100 in preparation for the recoat process in which the pistons 32*a*, 32*b* have been retracted while keeping the lengths of the arms 25*a*, 25*b* of the linear actuators 24*a*, 24*b* unchanged. As shown in FIG. 6B, such retraction of the pistons 32*a*, 32*b* increases the gap width to a value $w_2$ greater than $w_1$, which allows the donor foil 10 to be more easily retracted back through the gap 16, reducing the possibility for the remaining material 40 on the donor foil 10 to get dislodged onto the rollers 14*a*, 14*b*. While the holder 22*b* is being retracted, the displacement sensors 26*a*, 26*b* may be used to verify whether the holder 22*b* has been fully retracted.

Once the displacement sensors 26*a*, 26*b* have determined that the holder 22*b* has been fully retracted, the foil 10 may be translated back through the gap 16 to position used areas of the donor foil 10 under the dispensing unit 38, and additional material 40 may be dispensed onto the donor foil 10 by the dispensing unit 38. The pistons 32*a*, 32*b* may be re-engaged (i.e., turned on), returning the gap 16 back to the narrow gap width $w_1$. Advantageously, the respective lengths of the arms 25*a*, 25*b* remain unchanged during the re-engaging of the pistons 32*a*, 32*b*, allowing the re-positioning of the roller 14*b* back into the coating position with high precision. The arms 25*a*, 25*b* may function similarly to the door stopper on a door. Just as the length of a door stopper fixes a distance between the opened door and a wall, the arms 25*a*, 25*b* fix the width, $w_1$, of the gap 16 between the horizontally moveable roller 14*b* and the horizontally fixed roller 14*a*. Once the gap 16 has returned to the narrow width, $w_1$, the donor foil 10 may be translated (in the forward direction) through the gap 16 so as to recoat the donor foil 10. The newly dispensed material 40 may be spread over areas of the donor foil 10 where voids of the material 40 had formed due to the printing step, thereby creating another uniform layer of the material 40 over the donor foil 10.

Figure 6C:
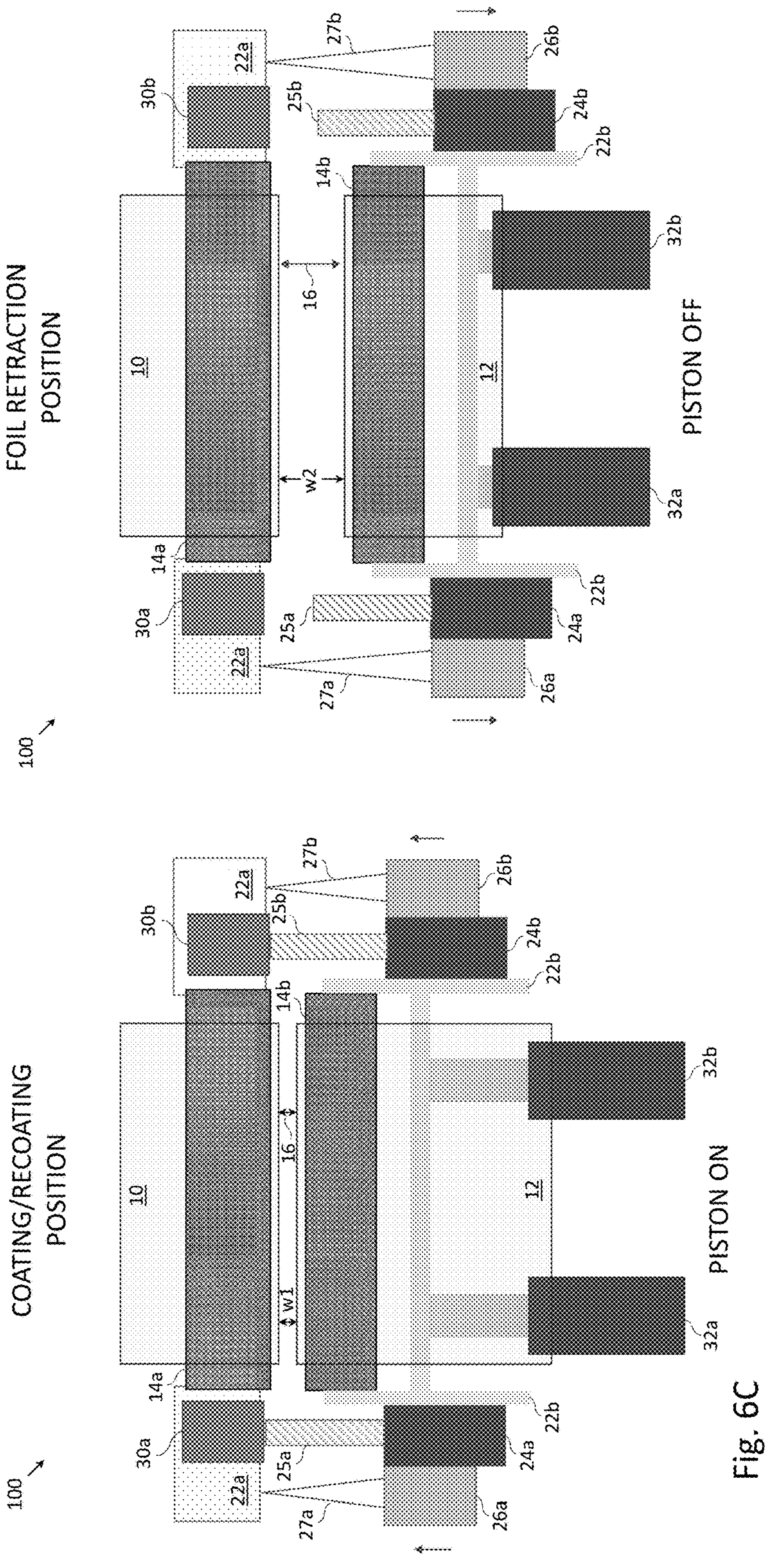

The recoat process can be efficiently performed only if the gap 16 can be adjusted in a very fast and accurate manner between the width, $w_1$, during the coating and recoating operations and the wider width, $w_2$, during the foil retraction operation. To achieve such goal, the holder 22*b* may be horizontally translated back and forth by pistons 32*a*, 32*b*, allowing the holder 22*b* to be re-positioned in a fast manner between the coating/recoating position and the foil retraction position, as shown in FIG. 6C.

Figure 7:
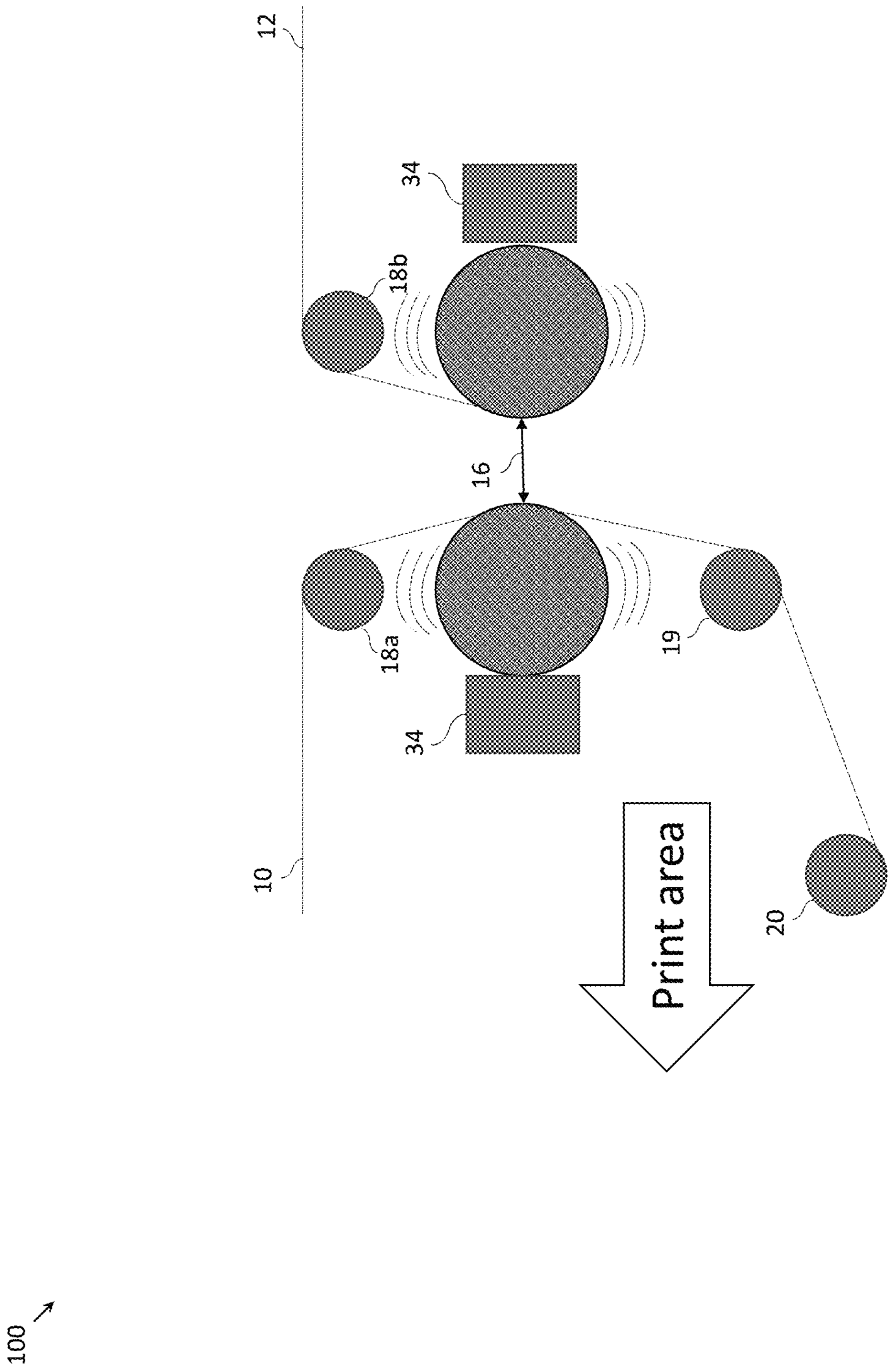
FIG. 7 depicts one or more optional ultrasound transducers for improving the coating quality when highly viscous materials are used, in accordance with one embodiment of the invention.

FIG. 7 depicts an optional ultrasound transducer 34 that can be added to the coating system 100. The ultrasound transducer 34 can be used to create a better coating on the donor foil 10 and is relevant mostly for highly viscous materials. One or more ultrasound transducers 34 may be placed in contact with the gap rollers 14*a*, 14*b*. The gap rollers 14*a*, 14*b* may transfer such vibration to the donor foil 10 and material 40, enabling a better coating for viscous materials 40 by driving the material 40 from the center of the donor foil 10 (where the material 40 is dispensed onto the donor foil 10) toward its respective sides.

Thus, methods and systems for coating a foil have been described. Many other embodiments will be apparent to those of skill in the art upon reviewing the above description. The scope of the invention should, therefore, be determined with reference to the appended claims, along with the full scope of equivalents to which such claims are entitled.

LIST OF REFERENCE NUMERALS

| | |
|---|---|
| 10 | Donor Foil |
| 12 | Cleaning Foil |
| 14a | Roller |
| 14b | Roller |
| 16 | Gap |
| 18a | Roller |
| 18b | Roller |
| 19 | Roller |
| 20 | Roller |
| 21 | Gap |
| 22a | Holder |
| 22b | Holder |
| 23 | Constriction |
| 24a | Linear Actuator |
| 24b | Linear Actuator |
| 25a | Arm |
| 25b | Arm |
| 26a | Displacement Sensor |
| 26b | Displacement Sensor |
| 27a | Laser beam |
| 27b | Laser beam |
| 28a | Motor |
| 28b | Motor |
| 30a | Piezoelectric Sensor |
| 30b | Piezoelectric Sensor |
| 32a | Piston |
| 32b | Piston |
| 34 | Ultrasonic Transducer |
| 36a | Cleaning System |
| 36b | Cleaning System |
| 38 | Dispensing Unit |
| 40 | Material |
| 50 | Controller |
| 100 | Coating System |
| $w_1$ | Gap width |
| $w_2$ | Gap width |

What is claimed is:

1. A method for coating a foil with a coating system, the coating system comprising:

a dispensing unit arranged to apply a material on a first foil advanced through a first gap between a first roller supported by a first holder and a second roller supported by a second holder; a first linear actuator mounted on the second holder for adjusting a position of a first arm; a second linear actuator mounted on the second holder for adjusting a position of a second arm; a first piezoelectric sensor mounted on the first holder for detecting a contact of the first arm on the first piezoelectric sensor; a second piezoelectric sensor mounted on the first holder for detecting a contact of the second arm on the second piezoelectric sensor; a piston configured to bias the second holder towards the first holder, wherein the first arm and the second arm are configured to counter the piston's biasing of the second holder towards the first holder when the first arm and second arm are extended; and a controller configured to control the first linear actuator and the second linear actuator so as to adjust a position of the second roller relative to a position of the first roller, thereby adjusting a width of the first gap between the first roller and the second roller;

the method comprising:

applying the material by the dispensing unit on the first foil located within the first gap between the first roller supported by the first holder and the second roller supported by the second holder;

advancing the first foil through the first gap between the first roller supported by the first holder and the second roller supported by the second holder, the first gap being associated with a thickness of a layer of the material applied on the first foil;

biasing the second roller by the piston towards the first roller;

adjusting the position of the first arm by the first linear actuator mounted on the second holder, wherein extension of the first arm by the first linear actuator counters the biasing of the second roller towards the first roller; adjusting the position of the second arm by the second linear actuator mounted on the second holder, wherein extension of the second arm by the second linear actuator counters the biasing of the second roller towards the first roller;

detecting, by the first piezoelectric sensor mounted on the first holder, the contact of the first arm on the first piezoelectric sensor;

detecting, by the second piezoelectric sensor mounted on the first holder, the contact of the second arm on the second piezoelectric sensor; and controlling with the controller the first linear actuator and second linear actuator so as to adjust the position of the second roller relative to the position of the first roller, thereby adjusting the width of the first gap between the first roller and the second roller.

2. The method of claim 1, further comprising advancing a second foil through the first gap with the second roller so as to remove a residue on the second foil from a previous coating or to recover an unused material on the second foil.

3. The method of claim 1, further comprising:

maintaining the first holder in a stationary position; and moving the second holder with respect to the first holder.

4. The method of claim 1, further comprising:

measuring, by a first displacement sensor mounted on the second holder, a first distance between the first displacement sensor and the first holder; and measuring, by a second displacement sensor mounted on the second holder, a second distance between the second displacement sensor and the first holder.

5. The method of claim 1, wherein the material is a liquid, a paste, an adhesive or a polymeric solution.

6. The method of claim 1, further comprising:

rotating the first roller by a first motor about an axis of the first roller; and rotating the second roller by a second motor about an axis of the second roller.

7. The method of claim 1, further comprising removing a residual material from the first roller and the second roller with cleaning systems, wherein each of the cleaning systems comprises a knife, a scraper, or a sponge with a solvent.

8. The method of claim 1, further comprising vibrating the first roller or the second roller with an ultrasound transducer.

9. The method of claim 1, further comprising:

prior to advancing the first foil through the first gap, positioning the second roller to contact the first roller; and measuring, by a displacement sensor mounted on the second holder, a distance between the displacement sensor and the first holder.

10. The method of claim 1, further comprising:

prior to advancing the first foil through the first gap, positioning the second roller to contact the first roller;

extending the first arm until the contact of the first arm on the first piezoelectric sensor is detected; and at a moment the contact of the first arm on the first piezoelectric sensor is detected, recording a position of the first arm.

* * * * *